United States Patent
Pawlowski et al.

(10) Patent No.: US 7,289,589 B2
(45) Date of Patent: Oct. 30, 2007

(54) MAXIMUM LIKELIHOOD BIT SYNCHRONIZER AND DATA DETECTOR

(75) Inventors: Peter R. Pawlowski, Solana Beach, CA (US); Mark A. Riches, San Diego, CA (US)

(73) Assignee: Northrop Grumman Corporation, Los Angeles, CA (US)

( * ) Notice: Subject to any disclaimer, the term of this patent is extended or adjusted under 35 U.S.C. 154(b) by 721 days.

(21) Appl. No.: 10/676,525

(22) Filed: Oct. 1, 2003

(65) Prior Publication Data
US 2005/0074078 A1    Apr. 7, 2005

(51) Int. Cl.
H04L 25/38 (2006.01)
H04L 7/02 (2006.01)
H04B 17/00 (2006.01)
H03D 3/22 (2006.01)

(52) U.S. Cl. .............. 375/369; 375/226; 375/333; 375/361

(58) Field of Classification Search ............. 375/226, 375/289, 293, 333, 337, 354, 355, 361, 369; 370/503; 702/69
See application file for complete search history.

(56) References Cited

U.S. PATENT DOCUMENTS

| 5,263,053 A | 11/1993 | Wan et al. |
| 5,325,402 A | 6/1994 | Ushirokawa |
| 5,363,412 A | 11/1994 | Love et al. |
| 5,432,820 A | 7/1995 | Sugawara et al. |
| 5,684,832 A | 11/1997 | Adachi et al. |
| 5,818,876 A | 10/1998 | Love |
| 5,867,538 A | 2/1999 | Liu |
| 6,567,484 B1 * | 5/2003 | Hirota et al. ............ 375/355 |
| 6,671,074 B2 * | 12/2003 | Akashi .................... 398/202 |
| 6,792,059 B2 * | 9/2004 | Yuan et al. ............. 375/354 |
| 2003/0076902 A1 * | 4/2003 | Yuan ....................... 375/319 |

* cited by examiner

*Primary Examiner*—Young T. Tse
(74) *Attorney, Agent, or Firm*—Tarolli, Sundheim, Covell & Tummino LLP

(57) ABSTRACT

A bit synchronizer (16) that includes a tapped delay line (38) connected to a plurality of timing hypothesis circuits. A control and adjudication circuit (50) is connected to the timing hypothesis circuits, and compares outputs of the timing hypothesis circuits and selects one. Each of the timing hypothesis circuits includes a sum-and-dump summer (112) that is connected to outputs of the tapped delay line (38). The timing hypothesis circuits further include an absolute value circuit (46) and an averaging circuit (48). A select switch (60) is connected to the summers (112) and receives a switch control signal from the control and adjudication circuit (50). A threshold test circuit (62) compares the selected output signal to a threshold value and outputs a mark or space symbol.

38 Claims, 4 Drawing Sheets

MAXIMUM LIKELIHOOD BIT SYNCHRONIZER AND DATA DETECTOR

BACKGROUND OF THE INVENTION

1. Field of the Invention

This invention relates generally to receivers and, more particularly, to receivers that include bit synchronizers.

2. Discussion of the Related Art

In some circumstances, transmitters may have a bit rate that is significantly less than the sample rate of a receiver. For example, several transmitter signals (such as UHF/VHF and other functions) that are transmitted to an Integrated Communications, Navigation and Identification Avionics (ICNIA) system of a Comanche helicopter have a 16 Kbit/second data mode. The UHF/VHF receiver that is used in the Comanche ICNIA system produces a baseband digital signal at a nominal 64 Ksample/second rate. In other words, there are normally 4 samples per baseband symbol. For AM signals, the received signal is positive-valued and corresponds to the envelope detected for on-off keying (OOK) for these functions. F or FM signals, the signal is bipolar or antipodal, corresponding to frequency shift keying (FSK). Currently, there is no device that is associated with a receiver that can alter the timing of the sampling clock of the receiver. Furthermore, a numerically-controlled oscillator and feedback loop are not available.

To successfully receive the data, the receiver must determine the unknown starting and ending samples of each data symbol—a process that is known as bit synchronization. Bit synchronization is obscured by received noise, signal fading, relative time drift and time jitter between the received symbol sequence and the sampling clock of the receiver. Control of the sampling clock of the receiver is not available to the bit synchronizer. To be successful, the bit synchronizer must operate strictly on the received data stream. The bit synchronizer must also determine the symbol timing, even when the transmit clock symbol rate and the receiver sampling rate are offset and have a relative drift.

SUMMARY OF THE INVENTION

In accordance with the teachings of the present invention, a communications system is disclosed that includes a transmitter that produces a transmitter signal at a first rate and a receiver that samples the transmitter signal at a higher rate than the first rate and generates a receiver signal. A maximum likelihood bit synchronizer that includes a tapped delay line is coupled to the receiver. Timing hypothesis circuits are connected to the tapped delay line. A control and adjudication circuit is connected to the timing hypothesis circuits. The control and adjudication circuit compares outputs of the timing hypothesis circuits to select one of the timing hypothesis circuits.

In other features of the invention, an antipodal circuit is connected to an input of the tapped delay line and generates an antipodal signal from the receiver signal. The antipodal circuit includes an average level estimator. The antipodal circuit further includes a summing circuit that receives the antipodal signal and the receiver signal and generates the antipodal signal.

In still other features of the invention, the transmitter signal is an on-off keyed signal and the tapped delay line includes delay elements. Each of the timing hypothesis circuits includes a sum-and-dump summer that is connected to outputs of the tapped delay line. Each of the timing hypothesis circuits further includes an absolute value circuit that is connected to the sum-and-dump summer. Each of the timing hypothesis circuits further includes an averaging circuit. The averaging circuit is a sliding window summer or a single pole, unity gain, low-pass filter.

In yet other features of the invention, a select switch is connected to the sum-and-dump summers. The select switch receives a switch control signal from the control and adjudication circuit that selects an output signal of one of the sum-and-dump summers. A threshold test circuit compares the selected output signal to a threshold value and outputs one of a mark symbol and a space symbol. An output control circuit receives an output control signal from the control and adjudication circuit. The output control circuit outputs zero, one or two mark or space signals in response to the output control signal.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE EMBODIMENTS

The following description of the embodiments of the invention is merely exemplary in nature and is in no way intended to limit the invention, its application, or uses.

Figure 1:
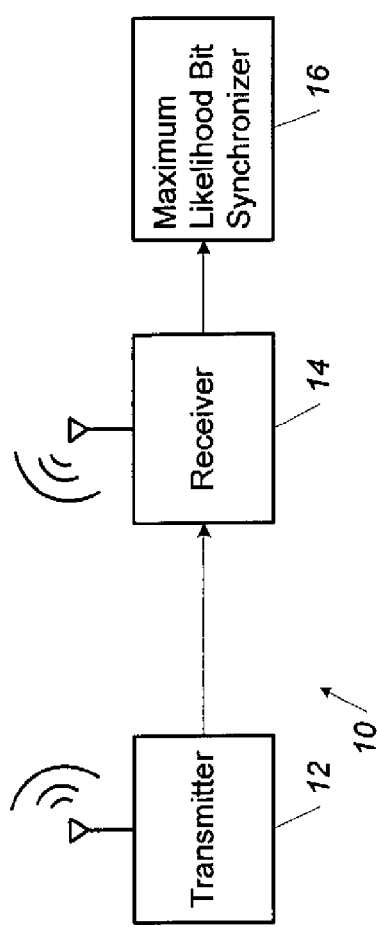
FIG. 1 is a functional block diagram illustrating a maximum likelihood bit synchronizer that is connected to a receiver according to the present invention.

Referring now to FIG. 1, a communications system 10 includes a transmitter 12, a receiver 14, and a maximum likelihood bit synchronizer 16, according to the present invention. The transmitter 12 generates a transmitter signal having a bit rate that is less than the sampling rate of the receiver 14. For example, the transmitter 12 transmits data at 16 Kbit/second and the receiver 14 samples at a 64 Ksample/second rate.

Figure 2:
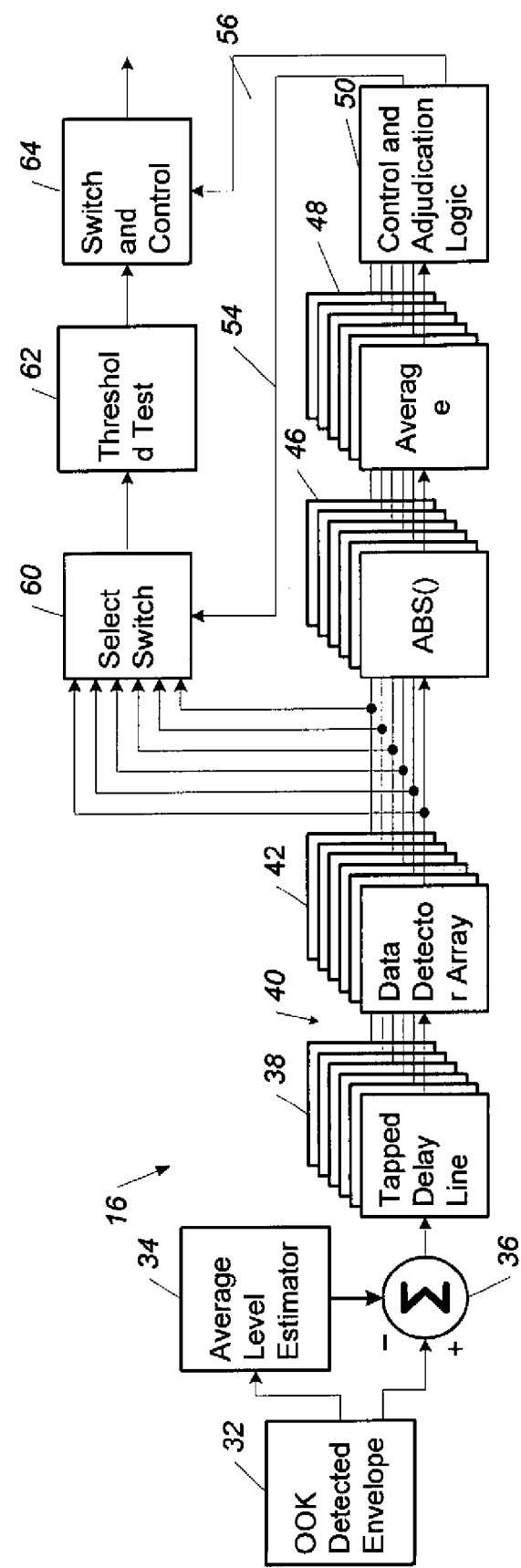
FIG. 2 illustrates the maximum likelihood bit synchronizer in further detail.

Referring now to FIG. 2, the maximum likelihood bit synchronizer 16 is shown in further detail. An on-off keyed (OOK) detected envelope signal 32 is output by the receiver 14 and input to an average level estimator 34 and a non-inverting input of a summer 36. The average level estimator 34 generates an average level estimate signal that is input to an inverting input of the summer 36. Subtracting the average level estimate signal from the OOK detected envelope signal 32 produces an antipodal signal.

An output of the summer 36 is input to a tapped delay line 38 having a plurality of outputs 40. The tapped delay line 38 creates a plurality of sample windows that are offset by one sample each. For example, the tapped delay line 38 creates six four-sample windows that are offset by one sample each. Each of the six four-sample windows correspond to six different timing hypotheses.

A data detector array 42 is connected to the outputs 40 of the tapped delay line 38. The data detector array 42 sums over each multi-sample window. Continuing with the example set forth above, the data detector array 42 sums over each 4-sample window. An absolute value array (ABS) 46 is connected to an output of the data detector array 42. The absolute value array 46 eliminates +/1 data modulation at the output of the data detector array 42. An averaging array 48 is connected to an output of the absolute value array 46. The averaging array 48 approximates the mean value of each output of the absolute value array 46.

A control and adjudication logic circuit 50 chooses the most likely timing hypothesis. The control and adjudication logic circuit 50 provides a detector select control signal 54 and a data output control signal 56. A select switch 60 receives outputs from the data detector array 42 and the detector select control signal 54. Using the detector select control signal 54, the selector switch 60 selects the output from the data detector array 42 that corresponds to the most likely timing hypothesis that is identified by the control and adjudication logic circuit 50. The output of the select switch 60 is connected to a threshold test circuit 62. The threshold test circuit 62 compares the selected signal to a threshold value, such as zero. If the selected signal is greater than the threshold value, the threshold test circuit 62 outputs a mark. If the selected signal is less than the threshold value, then the threshold test circuit 62 outputs a space. The output of the threshold test circuit 62 is connected to an output control circuit 64. The output control circuit 64 passes zero, one or two symbols depending upon the data output control signal 56 that is received from the control and adjudication logic circuit 50 as will be described further below.

Figure 3:
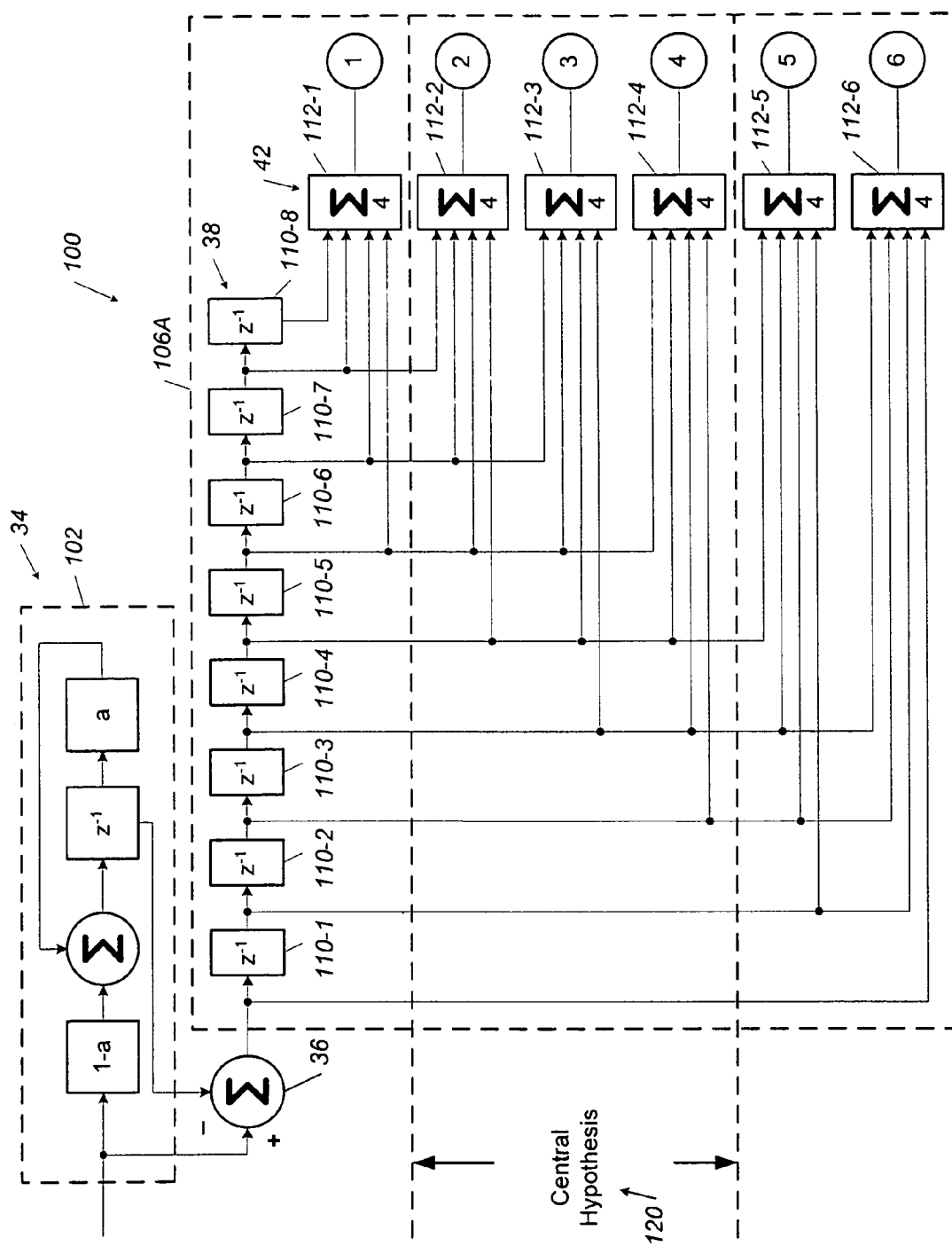
FIG. 3 illustrates a first subcircuit of a first exemplary maximum likelihood bit synchronizer.
Figure 4:
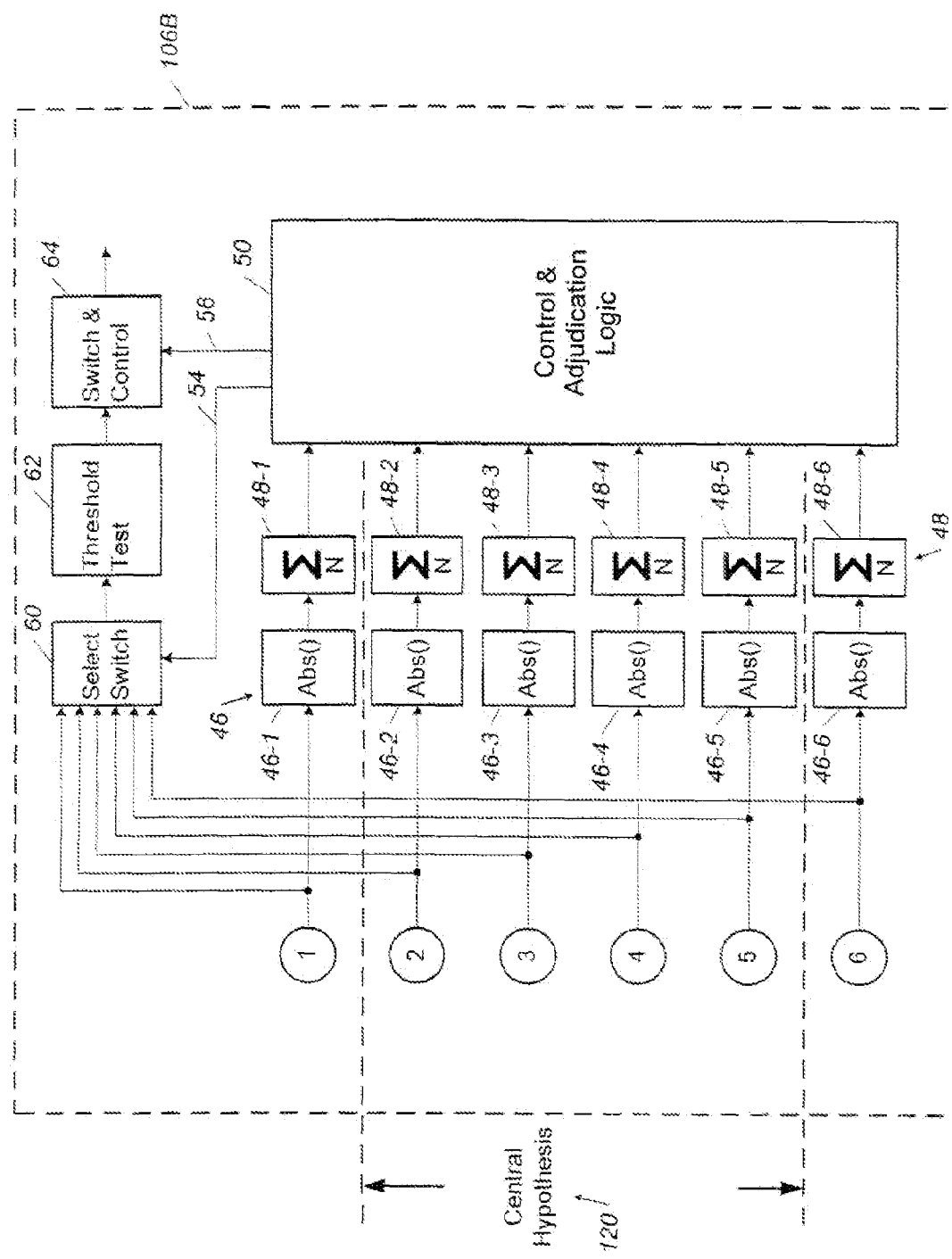
FIG. 4 illustrates a second subcircuit of the first exemplary maximum likelihood bit synchronizer that is connected to the first subcircuit of FIG. 3.

Referring now to FIGS. 3 and 4, an exemplary implementation of a maximum likelihood bit synchronization circuit 100, according to the invention, is shown. For purposes of clarity, reference numerals from FIG. 2 have been used where appropriate to identify similar elements. The detected signal 32 from FIG. 2 is input to the average level estimator 34 that is implemented using a single pole, recursive, infinite impulse response (IIR) filter 102 in one embodiment. The detected signal 32 is an OOK detected envelope signal in the example discussed above. However, as will be appreciated by those skilled in the art, the signal 32 can be any binary level signal suitable for the purposes described herein. An output of the filter 102 is input to an inverting input of the summer 36. The OOK detected envelope signal 32 is also input to a non-inverting input of the summer 36. The summer 36 generates the antipodal signal that is input to maximum likelihood bit synchronization subcircuits 106A and 106B.

The tapped delay line 38 includes n+2 delay elements 110-1, 110-2, . . . , 110-8 where n is an integer that is equal to (the transmitter data rate)/(the sampling rate) plus two. Parallel sum-and-dump summers 112-1, 112-2, . . . , 112-6 are used to implement the data detector array 42. n parallel absolute value circuits 46-1, 46-2, . . . , 46-6 are used to implement the absolute value array 46. n parallel averagers 48-1, 48-2, . . . , 48-6 are used to implement the averaging array 48.

Figure 5:
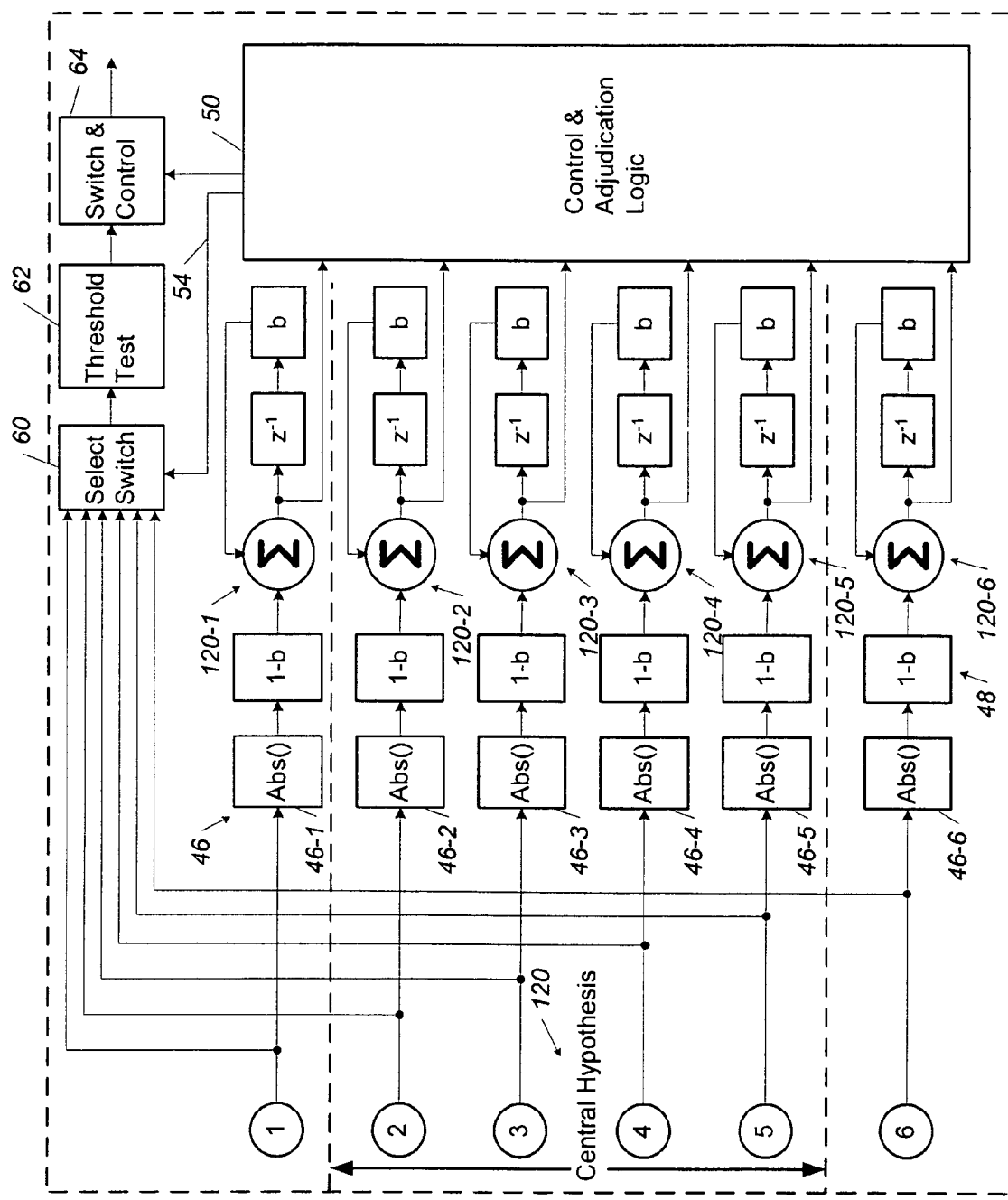
FIG. 5 illustrates an alternate second subcircuit of a second exemplary maximum likelihood bit synchronizer that is connected to the first subcircuit of FIG. 3.

Referring now to FIGS. 3 and 5, an alternate exemplary implementation of the maximum likelihood bit synchronizer is shown. The alternate maximum likelihood bit synchronizer implements the averaging circuit 48 in a different manner by replacing the sliding-window summers 48 -1, 48 -2, . . . , 48 -6 of FIG. 4 with single pole, unity-gain, low pass filters 120 -1, 120 -2, . . . , 120 -6 of FIG. 5.

The tapped delay line 38 creates a data array that is used by each sum-and-dump data detector 112. Each data detector 112 sums over (n−2) samples, which effectively integrates the signal over (n−2) adjacent samples. Each of the n parallel circuits corresponds to a timing hypothesis. Each timing hypothesis corresponds to a window of n−2 samples that are offset by at least one sample from all other timing hypotheses. For hypothesis Λ, Λ=0, 1, 2, 3, 4, 5, and the sum-and-dump output is:

$$Z_{\delta,k/4} = \sum_{l=k-\delta}^{k+3-\delta} y_l, \delta = 0, 1, 2, 3, 4, 5$$

This creates an output every fourth sample at the 16 Ksymbol/second rate. Each sum-and-dump summer output is offset by one sample, creating six timing hypotheses that can be compared. Six hypotheses, as opposed to four, are used to detect timing drift that leads to bit slippage. Because the signal samples are antipodal, the output of each sum and dump summer is either positive or negative depending upon the received symbol. The absolute value at each summer output eliminates this data modulation. The magnitude of the sum-and-dump output is then continuously accumulated and averaged using either a sliding window summation (FIGS. 3 and 4) or a single-pole recursive filter (FIGS. 3 and 5).

$$l_{\delta,n} = \frac{1}{N+1} \sum_{l=n-N}^{n} |Z_{\delta,n}|$$

Two additional hypotheses (n vs. n−2) are used to detect and prevent bit slippage. When the transmitter signal (symbol) rate and the sampling rate are mismatched, the maximum likelihood timing decision tends to drift towards either end of the four central hypotheses 120 (in FIGS. 3-5). Two additional timing hypotheses are used to detect drift and to prevent bit slippage. Advantageously, bit slippage is prevented without the need for a numerically controlled oscillator (NCO) and a feedback loop.

Continuing with the example, when the symbol rate is faster than the (sampling rate)/4, the maximum likelihood timing hypothesis tends to drift towards early timing hypotheses. When the timing decision drifts towards hypothesis 0, the averaged detector outputs for hypotheses 0 and 4 will be large at the same time. Because hypothesis 1 was previously the largest, drift to either hypothesis 0 or 4 is used to detect a bit slippage condition. When hypothesis 0 or 0/4 is largest, the maximum likelihood timing decision is shifted to the central timing hypothesis that is 4 steps later (timing hypothesis 4). Because the detected symbol propagates down the delay line, the symbol will be output twice if control is not performed. Therefore, when the maximum likelihood timing hypothesis moves from hypothesis 1 to 0 to 4, the data bit for that time period is suppressed or deleted using the output switch and control 64, which prevents a bit repeat.

When the symbol rate is slower than the (sampling rate)/4, the maximum likelihood timing hypothesis will drift towards late hypotheses. When the timing decision drifts to hypothesis 5, the averaged detector outputs for hypotheses 5 and 1 will be large at the same time. Because hypothesis 4 had just been the largest, drift to either hypothesis 5 or 1 is used to detect a bit slippage condition. When hypothesis 5 or 5/1 are largest, the maximum likelihood timing decision is shifted to the central hypothesis that is 4 steps earlier (timing hypothesis 1). Because the detected data is shifted back 4 samples earlier, the data bits will be lost if additional output control is not performed. Therefore, when the maximum likelihood timing hypothesis moves from hypothesis 4 to 5 to 1, the data bits at the output of detectors 5 and 1 are both taken at that bit period to prevent the loss of a bit using the output switch and control 64.

The maximum likelihood bit synchronizer according to the present invention produces a true maximum likelihood symbol timing decision. The maximum likelihood bit synchronizer uses an open-loop, feedforward configuration. Additional timing hypotheses and control and adjudication logic are used to detect relative received symbol and sampling clock drift. The maximum likelihood bit synchronizer also prevents bit slippage without the need for a numerically controlled oscillator (NCO) and a feedback loop.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, the specification and the following claims.

What is claimed is:

1. A maximum likelihood bit synchronizer for use in a communication system including a transmitter that generates a transmitter signal at a first rate and a receiver that samples the transmitter signal at a second rate higher than the first rate and generates a receiver signal, said synchronizer comprising:
    a tapped delay line;
    n timing hypothesis circuits coupled to said tapped delay line, wherein n is an integer equal to the second rate divided by the first rate plus two, wherein each of said n timing hypothesis circuits includes a sum-and-dump summer connected to n-2 outputs of said tapped delay line; and
    a control and adjudication circuit coupled to said n timing hypothesis circuits that compares outputs of said n timing hypothesis circuits and selects one of said n timing hypothesis circuits.

2. The synchronizer of claim 1 further comprising an antipodal circuit coupled to an input of said tapped delay line for generating an antipodal signal from said receiver signal.

3. The synchronizer of claim 2 wherein said antipodal circuit includes an average level estimator.

4. The synchronizer of claim 3 wherein said antipodal circuit further includes a summing circuit that receives a level estimator signal from said average level estimator and said receiver signal and generates said antipodal signal.

5. The synchronizer of claim 1 wherein the receiver signal is a general bilevel signal independent of modulation type.

6. The synchronizer of claim 1 wherein the transmitter signal is selected from the group consisting of on-off keyed signals and FSK signals.

7. The synchronizer of claim 1 wherein said tapped delay line includes n plus 2 delay elements.

8. The synchronizer of claim 1 wherein each of said n timing hypothesis circuits further includes an absolute value circuit that is connected to said sum-and-dump summer.

9. The synchronizer of claim 8 wherein each of said n timing hypothesis circuits further includes an averaging circuit coupled to said absolute value circuit.

10. The synchronizer of claim 9 wherein said averaging circuit is a sliding window summer.

11. The synchronizer of claim 9 wherein said averaging circuit includes a single pole, unity gain, low-pass filter.

12. The synchronizer of claim 1 further comprising a select switch coupled to said sum-and-dump summers, wherein said select switch receives a switch control signal from said control and adjudication circuit that selects an output signal of one of said sum-and-dump summers.

13. The synchronizer of claim 12 further comprising a threshold test circuit that compares said selected output signal to a threshold value and outputs one of a mark symbol or a space symbol.

14. The synchronizer of claim 13 further comprising an output control circuit that receives an output control signal from said control and adjudication circuit, wherein said output control circuit outputs zero, one, or two symbols in response to said output control signal.

15. A maximum likelihood bit synchronizer coupled to a receiver that generates a receiver signal, comprising:
    an average level estimator coupled to said receiver signal that generates an average signal;
    a summing circuit coupled to said receiver signal and said average signal that outputs an antipodal signal;
    a tapped delay line coupled to said summing circuit;
    a plurality of timing hypothesis circuits coupled to said tapped delay line, wherein each of said timing hypothesis circuits includes a data detector, an absolute value circuit connected to said data detector, and an averaging circuit connected to said absolute value circuit; and
    a control and adjudication circuit coupled to said timing hypothesis circuits that compares outputs of said timing hypothesis circuits and selects one of said timing hypothesis circuits.

16. The maximum likelihood bit synchronizer of claim 15 wherein n timing hypothesis circuits are provided and wherein n is the greatest integer that is equal to a transmitter rate divided by a sampling rate of the receiver signal plus 2.

17. The maximum likelihood bit synchronizer of claim 16 wherein said tapped delay line includes n+2 delay elements.

18. The maximum likelihood bit synchronizer of claim 16 wherein said data detector is a sum-and-dump summer connected to n-2) outputs of said tapped delay line.

19. The maximum likelihood bit synchronizer of claim 15 further comprising a select switch connected to said data detectors of said timing hypothesis circuits and to said control and adjudication circuit.

20. The maximum likelihood bit synchronizer of claim 19 further comprising:
    a threshold test circuit that compares a selected signal from the select switch to a threshold value and outputs one of a mark symbol and a space symbol; and
    an output control circuit that outputs zero, one, or two symbols from the threshold test circuit.

21. The maximum likelihood bit synchronizer of claim 20 wherein said control and adjudication circuit outputs a switch control signal to said select switch to select an output of one of said data detectors and an output control signal to said output control circuit to select the output of zero, one, or two symbols.

22. The maximum likelihood bit synchronizer of claim 15 wherein the receiver signal is a general bilevel signal independent of modulation type.

23. The maximum likelihood bit synchronizer of claim 15 wherein said receiver signal is selected from the group consisting of on-off keyed signals and FSK signals.

24. The maximum likelihood bit synchronizer of claim 15 wherein said averaging circuit is a sliding window summer.

25. The maximum likelihood bit synchronizer of claim 15 wherein said averaging circuit includes a single pole, unity gain, low-pass filter.

26. A maximum likelihood bit synchronizer for use in a communications system including a transmitter that generates a transmitter signal at a first rate and a receiver that samples the transmitter signal at a second rate higher than the first rate and generates a receiver signal, said synchronizer comprising:
 a tapped delay line;
 n timing hypothesis circuits coupled to said tapped delay line, wherein n is an integer equal to the second rate divided by the first rate plus two;
 an antipodal circuit coupled to an input of the tapped delay line for generating an antipodal signal from the receiver signal wherein said antipodal circuit includes an average level estimator; and
 a control and adjudication circuit coupled to said n timing hypothesis circuits that compares outputs of said n timing hypothesis circuits and selects one of said n timing hypothesis circuits.

27. The synchronizer of claim 26 wherein said antipodal circuit further includes a summing circuit that receives a level estimator signal from said average level estimator and said receiver signal to generate said antipodal signal.

28. The synchronizer of claim 26 wherein the receiver signal is a general bilevel signal independent of modulation type.

29. The synchronizer of claim 26 wherein the transmitter signal is selected from the group consisting of on-off keyed signals and FSK signals.

30. The synchronizer of claim 26 wherein said tapped delay line includes n plus 2 delay elements.

31. The synchronizer of claim 26 wherein each of said n timing hypothesis circuits includes a sum-and-dump summer connected to n-2 outputs of said tapped delay line.

32. The synchronizer of claim 31 wherein each of said n timing hypothesis circuits further includes an absolute value circuit that is connected to said sum-and-dump summer.

33. The synchronizer of claim 32 wherein each of said n timing hypothesis circuits further includes an averaging circuit coupled to said absolute value circuit.

34. The synchronizer of claim 33 wherein said averaging circuit is a sliding window summer.

35. The synchronizer of claim 33 wherein said averaging circuit includes a single pole, unity gain, low-pass filter.

36. The synchronizer of claim 31 further comprising a select switch coupled to said sum-and-dump summers, wherein said select switch receives a switch control signal from said control and adjudication circuit that selects an output signal of one of said sum-and-dump summers.

37. The synchronizer of claim 36 further comprising a threshold test circuit that compares said selected output signal to a threshold value and outputs one of a mark symbol or a space symbol.

38. The synchronizer of claim 37 further comprising an output control circuit that receives an output control signal from said control and adjudication circuit, wherein said output control circuit outputs zero, one, or two symbols in response to said output control signal.

\* \* \* \* \*